Jan. 23, 1951     R. L. COAN     2,538,933
REVERSING AND DIRECT DRIVE MECHANISM
FOR A PAIR OF SHAFTS
Filed July 28, 1949
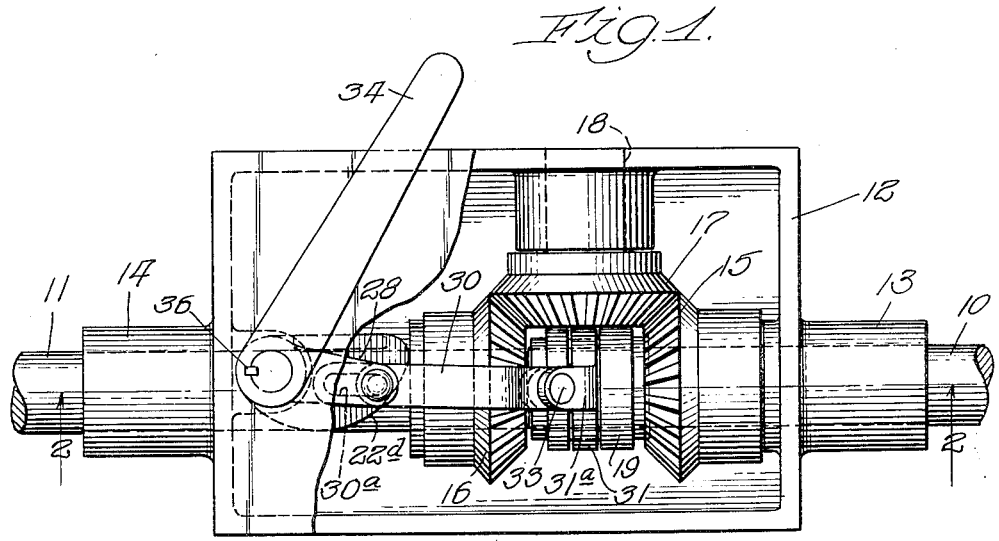
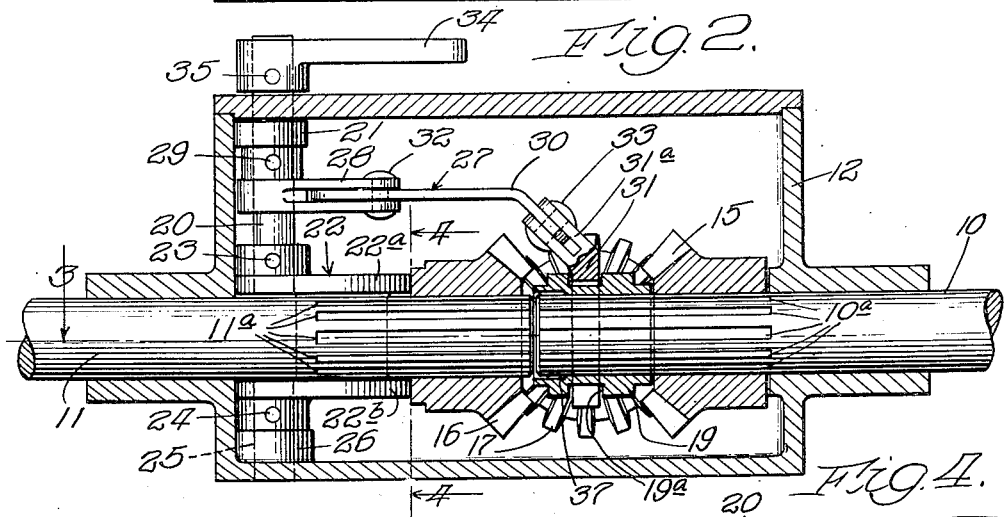
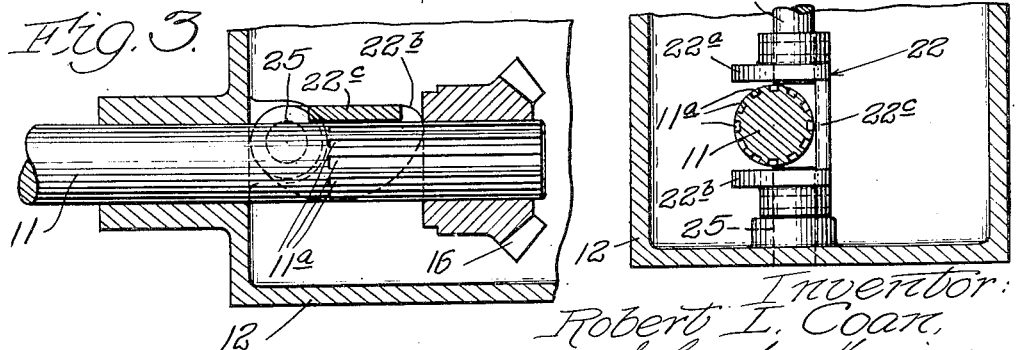
Inventor:
Robert L. Coan,
By Schroeder, Merriam,
Hofgren & Brady, Attys.

UNITED STATES PATENT OFFICE 2,538,933

REVERSING AND DIRECT DRIVE MECHANISM FOR A PAIR OF SHAFTS

Robert L. Coan, Dana, Ill., assignor, by mesne assignments, to Knoedler Manufacturers, Inc., Streator, Ill., a corporation of Illinois Application July 28, 1949, Serial No. 107,278

10 Claims. (Cl. 74—379)

This invention relates to a reversing gear and direct drive mechanism for a pair of shafts.

The mechanism of this invention is adapted to be used on a pair of shafts having one end of each shaft adjacent the other, with one of the shafts being adapted to be a driven shaft and the other a drive shaft. The mechanism includes gears which may be operably connected together for connecting the shafts for rotation in opposite directions together with means for disengaging the gears and directly connecting the shafts for rotation in the same direction. The mechanism of this invention is of simple construction and is readily operable to obtain the desired direction of drive in the driven shaft.

The new reversing and direct drive mechanism for the pair of shafts comprises gearing for connecting the shafts for rotation in opposite directions, a connecting member mounted on the first shaft for rotation therewith and movable thereon to engage the second shaft for locking both shafts together for rotation in the same direction, and a lever system for first disengaging the gearing and then moving the connecting member into engagement with the second shaft for locking the two shafts and then first moving the connecting member out of engagement with the second shaft and then engaging the gearing. In a preferred construction the shafts are substantially aligned with the adjacent ends extending into a gear box in which is located the operating mechanism of the structure.

The invention will be described as related to the embodiment shown in the accompanying drawings. Of the drawings: Fig. 1 is a plan view of the mechanism with the two shafts broken away and a portion of the mechanism broken away for clarity of illustration; Fig. 2 is a section taken substantially along line 2—2 of Fig. 1; Fig. 3 is a fragmentary section taken substantially along line 3 of Fig. 2; and Fig. 4 is a section taken substantially along line 4—4 of Fig. 2.

The reversing and direct drive mechanism of this invention is mounted on the adjacent ends of a pair of shafts. The mechanism permits interconnection of the shafts for rotation in the same or opposite directions at the will of the operator. As shown, the mechanism is used on a first shaft 10 and a second shaft 11, with these shafts being substantially aligned and having their ends adjacent each other. The mechanism in the embodiment shown includes a gear box 12 into which the shafts 10 and 11 extend through bearing portions 13 and 14 located on opposite sides of the gear box 12. Mounted on the first shaft 10 within the gear box is a first bevel gear 15 fastened to the shaft for rotation therewith. Also located within the gear box 12 is a second bevel gear 16 slidably mounted on the adjacent end of the second shaft 11 for rotation therewith. A third bevel gear 17 is mounted on a stub shaft 18 positioned on one wall of the gear box and engaging the first bevel gear 15 and also engaging the second bevel gear 16 when the shafts 10 and 11 are locked together for rotation in opposite directions.

The second bevel gear 16 is mounted for rotation on the second shaft 11 by parallel splines engaging parallel grooves 11a extending longitudinally of the second shaft 11. With this arrangement the second gear 16 is slidable into and out of engagement with the third gear 17, while being rotatable with the second shaft 11.

Mounted on the end of the first shaft 10 between the bevel gears 15, 16 and 17 is an annular connecting member 19 provided with an annular groove 19a on the outer surface thereof. This connecting member 19 is also provided with a plurality of substantially parallel splines engaging parallel grooves 10a at the end of the first shaft 10 and extending longitudinally thereof. These grooves 10a also serve as a mounting for the first bevel gear 15. The splines of the connecting member 19 and the grooves permit the member to be slidable on the first shaft 10, but holds the connecting member so that it is rotatable therewith. When the bevel gears 15, 16 and 17 are interconnected so that the shafts 10 and 11 are rotatable in opposite directions, the connecting member 19 is wholly on the first shaft 10.

Also located within the gear box 12 is a rod member 20 extending through one wall of the gear box to a position adjacent the second shaft 11 and arranged substantially transversely thereof. This rod member 20 is rotatably mounted in a bracket 21 mounted on the inner surface of one wall of the gear box.

Fastened to the inner end of the rod member 20 is a cam member 22 comprising a pair of cam portions 22a and 22b with these cam portions being located on opposite sides of the second shaft 11 and interconnected at one side thereof with a yoke portion 22c. The cam member 22 is adapted to bear against the second bevel gear 16, as shown in the drawings, and the yoke portion 22c is positioned adjacent the second shaft 11 when the cam member is in engagement with the second bevel gear 16 to hold this gear in engagement with the third bevel gear 17. As shown most clearly in Figs. 1 and 3, each of the cam portions 22a and 22b is curved as indicated at 22d to provide cam surfaces. One cam portion 22a is locked to the rod member 20 by means of a pin 23 or the like. The other cam portion 22b is locked by means of a pin 24 or the like to a short stub shaft 25 rotatably held in a bracket 26 located on the inner surface of the gear box 12. The stub shaft 25 is substantially aligned with the rod member 20 and a line connecting the centers of the stub shaft and the rod member substantially defines a diameter of the second shaft 11.

In order to operate the annular connecting member 19, there is provided a linkage 27 operably connected between the rotatable rod member 20 and the connecting member 19. This linkage comprises a first linkage bar 28 attached to the rod member 20 by means of a pin 29 or the like for rotation therewith, a second linkage bar 30 having one end rotatably connected to an end of the first linkage bar 28 and the other end rotatably connected to a bifurcated yoke 31 fixed in the groove 19a in the connecting member 19. The first linkage bar 28 is provided with a bifurcated end with the adjacent end of the second linkage bar 30 being held within the bifurcations, as shown in Fig. 2. The end of the second linkage bar 30 that is located between the bifurcations is provided with an elongated slot 30a, as shown in Fig. 1. The extreme end of the first linkage bar 28 is provided with a bolt 32 passing through the slot 30a. The slot 30a, the bolt 32 and the bifurcated end of the linkage bar 28 provides a lost motion connection between the linkage bars 28 and 30.

The yoke 31, located within the groove 19a, is also provided with a bifurcated end 31a in which the other end of the second linkage bar 30 is held. The linkage bar 30 and the bifurcated end 31a of the yoke 31 are rotatably connected by means of a bolt 33 or the like passing therethrough. If desired the yoke 31 may be slidably mounted on a bar extending across the gear box 12 substantially parallel to the shafts 10 and 11 in order to guide the movement of the yoke and connecting member 19.

When the cam member 22 is in the position shown in the drawings to hold the second bevel gear in mesh with the third bevel gear 17, the first and second linkage bars 28 and 30 will be beyond the dead-center position as shown in Fig. 1 to insure holding the connecting member 19 wholly on the first shaft 10 and out of engagement with the second shaft 11.

In order to operate the mechanism, the outer end of the rod member 20 beyond the gear box 12 is provided with an operating lever 34 fastened to this end of the rod member 20 by means of a pin 35 or the like. The lever 34 is also keyed to the rod member 20 by means of a key 36.

When the parts of the mechanism are in the positions shown in the drawings, the connecting member 19 is located wholly on the first shaft 10 and the second bevel gear 16 is held in mesh with the third bevel gear 17 by means of the cam member 22. In this arrangement, the shafts 10 and 11 are geared together for rotation in opposite directions. When it is desired to connect the shafts for rotation in the same direction, the operating lever 34 is rotated to the left, as viewed in Fig. 1. This rotation of the lever causes the cam member 22 to be also rotated to the left (Fig. 1) to release the second bevel gear 16. Because of the lost motion connection between the linkage bars 28 and 30, as provided by the slot 30a, no force will be brought on the connecting member 19 until the cam member has been removed from the second bevel gear 16. Further rotation of the operating lever 34, however, causes the connecting member to be moved to the left as shown in Fig. 1 thereby moving the second bevel gear 16 out of mesh with the third bevel gear 17 and causing the splines on the inner surface of the connecting member 19 to engage the grooves 11a in the second shaft 11 and lock the two shafts 10 and 11 together for rotation in the same direction.

In order to prevent locking the shafts together before the gear 16 has been moved out of engagement with the gear 17, the inner surface of the connecting member 19 on the end adjacent the second shaft 11 is cut away, as indicated at 37, for a depth at least equal to the distance required to move the second bevel gear 16 out of engagement with the third bevel gear 17. This arrangement insures disengagement of the second and third gears 16 and 17 as the second gear is moved by the abutting of the connecting member against the second gear.

When the shafts 10 and 11 are interconnected together by means of the connecting member 19 for rotation in the same direction, the operating lever 34 will have been moved to its furthest position to the left, as viewed in Fig. 1. When it is desired to again connect the shafts 10 and 11 for rotation in opposite directions, the lever 34 is moved to the right. The linkage 37 causes the connecting member 19 to be moved out of engagement with the second shaft 11 and wholly in engagement with the first shaft 10. Further rotation of the lever 34 causes the cam member 22 to bear against the second bevel gear 16 and move this gear into engagement with the third bevel gear 17. Because of the particular shape of the cam 22, the gear 16 is moved smoothly into place in mesh with gear 17 and is firmly locked in this position. When the parts of the mechanism have again assumed the positions shown in the drawings, the gears will be in mesh so that the shafts 10 and 11 are rotatable in opposite directions.

The reversing and direct drive mechanism of this invention finds many uses on equipment that requires reversal of rotation of a shaft. The mechanism is particularly useful, however, on corn pickers and the like for reversing the snapping unit shaft. The two shafts 10 and 11, as illustrated, may be used in place of the main shaft of the corn picker which drives the snapping unit. When the shafts 10 and 11 are connected for rotation in the same direction, the corn picker will operate in its usual manner. However, when the snapping units become clogged with stalks or the like, it is only necessary to operate the lever 34 to reverse the shaft 11 and thereby operate the snapping unit in the opposite direction so that it readily becomes unclogged. With this arrangement either of the shafts 10 or 11 may be connected to the driving mechanism and the other shaft may be connected to the snapping unit. Such an arrangement is of great importance as it avoids the dangers encountered when the operator of the corn picker attempts to free the snapping unit while the corn picker is still operating. Many accidents have occurred when the operator accidentally gets his hand or arm caught in the snapping unit. By using the reversing and direct drive mechanism of this invention, such accidents are avoided. Although the mechanism is particularly useful on corn pickers, it may be used on any kind of mechanism where alternate direct and reverse drives are required, as is pointed out above.

Having described my invention as related to the embodiment shown in the accompanying drawings, it is my intention that the invention be not limited by any of the details of description unless otherwise specified, but rather be construed broadly within its spirit and scope as set out in the accompanying claims.

I claim:

1. A reversing and direct drive mechanism for a pair of substantially aligned shafts having one end of each adjacent the other, one of said shafts being adapted to be a driven shaft and the other a drive shaft, said mechanism comprising interconnected gearing for connecting said shafts for rotation in opposite directions and including a gear slidable on one shaft for engagement with another gear in said gearing, a connecting member slidably mounted on the first shaft for rotation thereon, the adjacent end of the second shaft carrying said slidable gear and adapted to be engaged by said connecting member for rotation therewith, and a lever system for disengaging said gearing by moving said slidable gear away from said other gear and moving the connecting member into engagement with the second shaft for locking the shafts together for rotation in the same direction, and then moving the connecting member out of engagement with the second shaft and engaging the gears, said lever system including a movable cam member adapted to press said slidable gear into mesh with said other gear for releasably holding said gears in engagement, and said connecting member being cut away on the inner surface thereof at the end adjacent the second shaft for a depth at least equal to the distance required to move said slidable gear out of engagement with said other gear.

2. The mechanism of claim 1 wherein said lever system also includes a connecting linkage operably connected to said connecting member and operable to move said member into contact with said slidable gear to withdraw said gear from engagement with said other gear and substantially simultaneously move the connecting member into engagement with said second shaft.

3. The mechanism of claim 1 wherein said lever system also includes a connecting linkage operably connected to said connecting member and operable to move said member into contact with said slidable gear to withdraw said gear from engagement with said other gear and substantially simultaneously move the connecting member into engagement with said second shaft, said linkage being operably connected to said cam member and including a lost motion connection in said connecting linkage permitting disengagement of said cam member prior to movement of said connecting member and slidable gear.

4. A reversing and direct drive mechanism for a pair of substantially aligned shafts having one end of each adjacent the other, one of said shafts being adapted to be a driven shaft and the other a drive shaft, said mechanism comprising interconnected gearing for connecting said shafts for rotation in opposite directions and including a gear slidable on one shaft for engagement with another gear in said gearing, a connecting member slidably mounted on the first shaft for rotation thereon, the adjacent end of the second shaft carrying said slidable gear and adapted to be engaged by said connecting member for rotation therewith, and a lever system for disengaging said gearing by moving said slidable gear away from said other gear and moving the connecting member into engagement with the second shaft for locking the shafts together for rotation in the same direction, and then moving the connecting member out of engagement with the second shaft and engaging the gears, said lever system including a cam member adjacent the second shaft and movable into engagement with said slidable gear for releasably holding said gears in engagement and a connecting linkage operable with said cam member to hold said connecting member on said first shaft and away from said second shaft when said cam member engages said slidable gear and to move said member into contact with said slidable gear when the cam member is moved to released position to withdraw said slidable gear from engagement with the other gear and move the connecting member into engagement with said second shaft.

5. A reversing and direct drive mechanism for a pair of substantially aligned shafts having one end of each adjacent the other, one of said shafts being adapted to be a driven shaft and the other a drive shaft, said mechanism comprising interconnected gearing for connecting said shafts for rotation in opposite directions and including a gear slidable on one shaft for engagement with another gear in said gearing, a connecting member slidably mounted on the first shaft for rotation thereon, the adjacent end of the second shaft carrying said slidable gear and adapted to be engaged by said connecting member for rotation therewith, and a lever system for disengaging said gearing by moving said slidable gear away from said other gear and moving the connecting member into engagement with the second shaft for locking the shafts together for rotation in the same direction, and then moving the connecting member out of engagement with the second shaft and engaging the gears, said lever system including a rotatable rod member adjacent said second shaft, a cam member mounted on said rod member for rotation therewith into engagement with said slidable gear for holding said gears in engagement, said cam member comprising a pair of cam portions on opposite sides of said second shaft attached together by a yoke portion arranged adjacent said second shaft when the cam member is in engagement with said slidable gear, a connecting linkage including a bar fastened to said rod member for rotation therewith and a second bar rotatably fastened to said first bar and operably connected to said connecting member for holding said member on said first shaft and away from said second shaft when said cam member is in said engagement with the slidable gear and to move said member against said slidable gear to withdraw said slidable gear from engagement with said other gear and move the connecting member into engagement with said second shaft.

6. A reversing and direct drive mechanism for a pair of substantially aligned shafts having one end of each adjacent the other, one of said shafts being adapted to be a driven shaft and the other a drive shaft, said mechanism comprising a first bevel gear attached to a first shaft for rotation therewith, a second bevel gear attached to the second shaft for rotation therewith and slidable thereon for movement toward and away from the first gear, a third bevel gear meshing with said first gear and with the second gear when said first and second gears are closest to each other, said intermeshing gears serving to connect the shafts for rotation in opposite directions, a connecting member slidably mounted on the first shaft and rotatable therewith, said member being adapted to be moved into engagement with the adjacent end of the second shaft as well as the first shaft for locking said shafts for rotation in the same direction when the second gear is moved out of engagement with the third gear, said connecting member having the inner surface thereof surrounding the first shaft cut away on the end adjacent the second shaft for a depth at least equal to the distance required to move said second gear out of engagement with the third gear, a cam member movable into and out of engagement with the second gear alternately to hold the second and third gears in mesh and to release the second gear, and a linkage engaging the connecting member and operable with the cam member for sliding the connecting member to move the second gear out of mesh with the third gear and engage the connecting member with the adjacent end of the second shaft when the cam member has been released from the third gear.

7. The mechanism of claim 6 wherein said connecting member is of annular shape and is provided on the outer surface thereof with an annular groove in which is held an annular collar with the connecting member therein, said collar forming a part of said linkage.

8. A reversing and direct drive mechanism for a pair of substantially aligned shafts having one end of each adjacent the other, one of said shafts being adapted to be a driven shaft and the other a drive shaft, said mechanism comprising a first bevel gear attached to a first shaft for rotation therewith, a second bevel gear attached to the second shaft for rotation therewith and slidable thereon for movement toward and away from the first gear, a third bevel gear meshing with said first gear and with the second gear when said first and second gears are closest to each other, said intermeshing gears serving to connect the shafts for rotation in opposite directions, an annular connecting member slidably mounted on the first shaft and rotatable therewith, said member having an annular groove on the outer surface thereof and said member being adapted to be moved into engagement with the adjacent end of the second shaft as well as the first shaft for locking said shafts for rotation in the same direction when the second gear is moved out of engagement with the third gear, said connecting member having the inner surface thereof surrounding the first shaft cut away on the end adjacent the second shaft for a depth at least equal to the distance required to move said second gear out of engagement with the third gear, a gear box surrounding the adjacent ends of said shafts, said gears and said connecting member with said third gear being mounted on a side of said gear box, a rod member rotatably mounted in said gear box and extending through one wall of the gear box transversely of said second shaft to a point adjacent said shaft, a cam member including a pair of cam portions on opposite sides of said second shaft and having one cam portion attached to said rod member and the other portion rotatably mounted in said gear box at a point aligned with said rod member, said cam portions being movable into and out of engagement with the second gear when said rod member is rotated alternately to hold the second and third gears in mesh and to release the second gear, the cam portions being connected by a yoke portion arranged adjacent said second shaft when the cam member is in said engagement with the second gear, a linkage bar attached to the rod member for rotation therewith, a second linkage bar rotatably attached at one end to the first linkage bar, an annular member engaging the groove in said connecting member and rotatably attached to the other end of the second linkage bar, said linkage bars holding the connecting member wholly on the first shaft when the cam member holds the second and third gears in engagement and being operable by rotation of the rod member to move the connecting member into engagement with both shafts when the cam member has been moved to release said second gear, said connecting member being in abutting relationship with the second gear to move said gear out of engagement with the third gear, and said linkage bars having a lost motion connection therebetween to permit movement of the cam member to a position out of engagement with second gear before the connecting member is moved, and an operating lever fastened to said rod member at a point outside said gear box, said linkage bars being at a position beyond the dead center when the connecting member is wholly in engagement with the first shaft.

9. A reversing and direct drive mechanism for a pair of shafts having one end of each adjacent the other, one of said shafts being adapted to be a driven shaft and the other a drive shaft, said mechanism comprising gearing for connecting said shafts for rotation in opposite directions, a connecting member mounted on the first shaft for rotation therewith and movable thereon to engage said second shaft for locking the shafts together for rotation in the same direction, and a lever system for first disengaging said gearing and then moving said connecting member into engagement with the second shaft for locking the shafts together, and then for first moving the connecting member out of engagement with the second shaft and then engaging the gearing, said gearing including a gear slidable on said second shaft and engageable with another gear in said gearing when the shafts are connected for rotation in opposite directions, and said lever system includes a cam member adapted to press said slidable gear into mesh with said other gear for releasably holding said gears in engagement.

10. A reversing and direct drive mechanism for a pair of substantially aligned shafts having one end of each adjacent the other, one of said shafts being adapted to be a driven shaft and the other a drive shaft, said mechanism comprising interconnected gearing for connecting said shafts for rotation in opposite directions and including a gear slidable on one shaft for engagement with another gear in said gearing, a connecting member slidably mounted on the first shaft for rotation thereon, the adjacent end of the second shaft carrying said slidable gear and adapted to be engaged by said connecting member for rotation therewith, and a lever system for disengaging said gearing by moving said slidable gear away from said other gear and moving the connecting member into engagement with the second shaft for locking the shafts to gether for rotation in the same direction, and then moving the connecting member out of engagement with the second shaft and engaging the gears, said lever system including a cam member adjacent the second shaft and movable into engagement with said slidable gear for releasably holding said gears in engagement and a connecting linkage operable with said cam member to hold said connecting member on said first shaft and away from said second shaft when said cam member engages said slidable gear and to move said connecting member into contact with said slidable gear when the cam member is moved to released position to withdraw said slidable gear from engagement with the other gear and move the connecting member into engagement with said second shaft, said cam member including a pair of cam portions on opposite sides of said second shaft attached together by an interconnecting yoke portion arranged adjacent said second shaft when the cam member is in engagement with said slidable gear, said yoke portion serving to connect said cam portions for movement as a unit and also being arranged to bear against said second shaft and position said cam portions against said slidable gear to lock it in mesh with said other gear.

ROBERT L. COAN.

REFERENCES CITED

The following references are of record in the file of this patent:

UNITED STATES PATENTS

| Number | Name | Date |
|---|---|---|
| 424,699 | Bentley | Apr. 1, 1890 |
| 1,394,373 | Tellefsen | Oct. 18, 1921 |
| 1,431,642 | Farrar | Oct. 10, 1922 |
| 1,525,207 | Shanks | Feb. 3, 1925 |
| 1,659,820 | Hinds | Feb. 21, 1928 |
| 1,984,354 | Campbell | Dec. 18, 1934 |
| 2,314,549 | Milbrath | Mar. 23, 1943 |

FOREIGN PATENTS

| Number | Country | Date |
|---|---|---|
| 622,587 | France | June 1, 1927 |